United States Patent
Wang et al.

(10) Patent No.: US 9,800,921 B2
(45) Date of Patent: Oct. 24, 2017

(54) IN-HOME SMART VIDEO CACHE

(71) Applicant: Verizon Patent and Licensing Inc., Arlington, VA (US)

(72) Inventors: Dongchen Wang, Concord, MA (US); Michael P. Ruffini, Methuen, MA (US); Jianxiu Hao, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 75 days.

(21) Appl. No.: 14/472,934

(22) Filed: Aug. 29, 2014

(65) Prior Publication Data

US 2016/0066025 A1     Mar. 3, 2016

(51) Int. Cl.
| H04N 21/433 | (2011.01) |
| H04N 21/442 | (2011.01) |
| H04N 21/45  | (2011.01) |
| H04N 21/436 | (2011.01) |
| H04N 21/466 | (2011.01) |

(52) U.S. Cl.
CPC ... *H04N 21/4331* (2013.01); *H04N 21/43615* (2013.01); *H04N 21/44222* (2013.01); *H04N 21/4532* (2013.01); *H04N 21/4667* (2013.01)

(58) Field of Classification Search
CPC .......................... H04N 21/433; H04N 21/4331
See application file for complete search history.

(56) References Cited

U.S. PATENT DOCUMENTS

| 6,853,728 B1 * | 2/2005 | Kahn | H04N 5/913 348/E7.056 |
| 2008/0301745 A1 * | 12/2008 | Liu | H04N 21/2221 725/110 |
| 2009/0199231 A1 * | 8/2009 | Tsuria | H04N 5/76 725/32 |
| 2010/0050227 A1 * | 2/2010 | Acharya | H04L 12/1868 725/151 |
| 2010/0121936 A1 * | 5/2010 | Liu | H04N 5/44543 709/217 |
| 2014/0201802 A1 * | 7/2014 | Boss | H04N 21/4263 725/134 |
| 2014/0310388 A1 * | 10/2014 | Djukic | H04L 41/0816 709/221 |

* cited by examiner

*Primary Examiner* — Olugbenga Idowu

(57) ABSTRACT

A method, performed by a computer device, may include determining one or more frequently watched television channels associated with a customer's account. The method may further include obtaining content associated with the one or more frequently watched television channels via multicast transmission units from a video serving office associated with a television services provider; converting the multicast transmission units into video segments playable by a media playing device; storing the video segments in a cache associated with the computer device; detecting a selection of a television channel associated with the obtained content made via the media playing device; and providing the stored video segments to the media playing device, in response to detecting the selection of the television channel associated with the obtained content.

20 Claims, 7 Drawing Sheets

IN-HOME SMART VIDEO CACHE

BACKGROUND INFORMATION

Television channels have traditionally been delivered to customers via quadrature amplitude modulation (QAM). In a QAM television system, a television channel may be sent via a particular frequency range and a set-top box at a customer's home may include a QAM tuner that may be used to select a particular television channel. However, Internet Protocol television (IPTV) is becoming more common. An IPTV system delivers television channels over a packet-switched network using streaming media protocols. IPTV may pose network challenges for a provider of television services, especially with respect to traffic loads on the last mile to customers' homes.

DETAILED DESCRIPTION OF PREFERRED EMBODIMENTS

Figure 1:
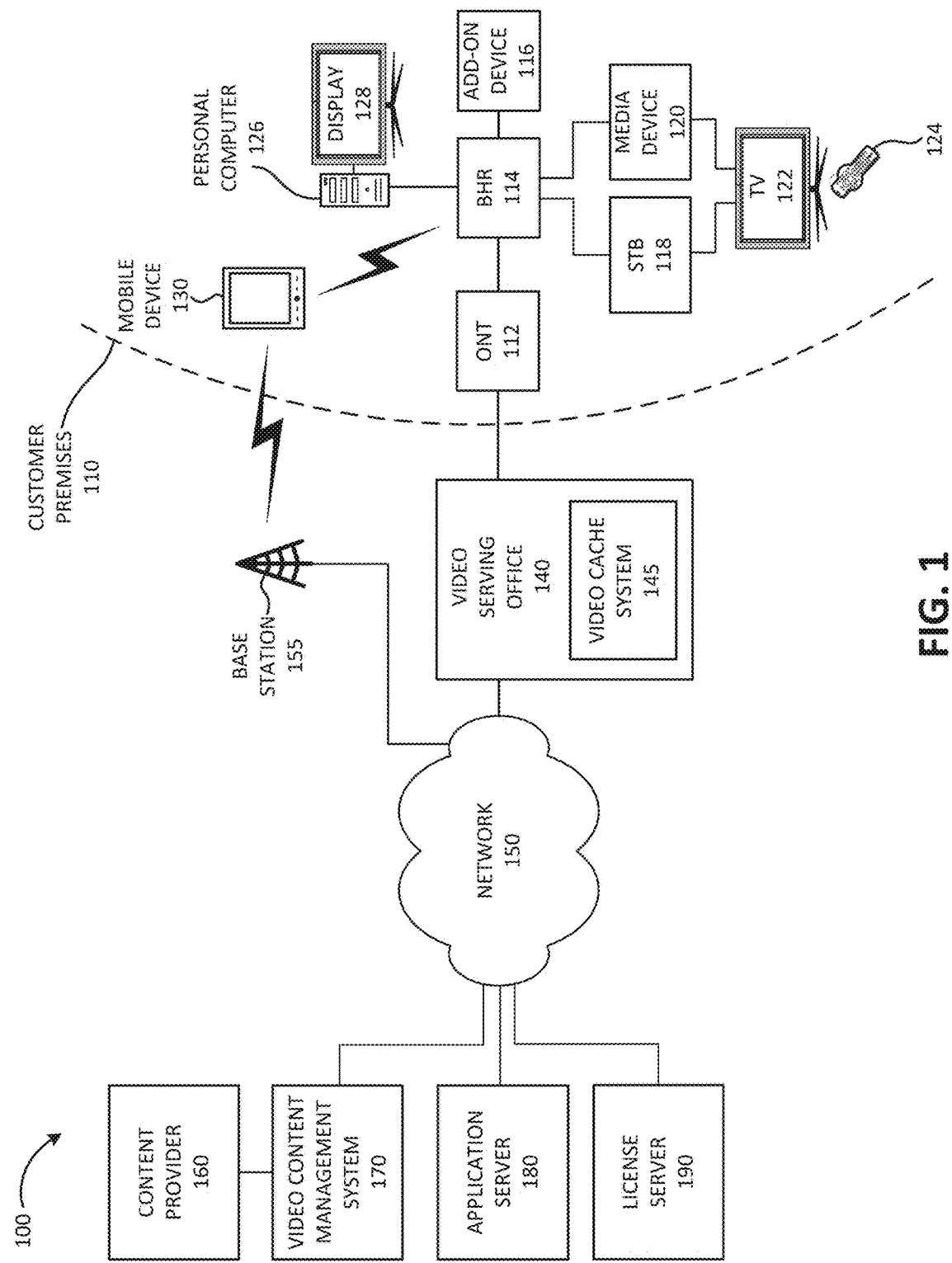
FIG. 1 is a diagram illustrating an environment according to one or more implementations described herein.

The following detailed description refers to the accompanying drawings. The same reference numbers in different drawings identify the same or similar elements.

A provider of IPTV television services may broadcast television channels using unicast streaming. In unicast streaming, a customer premises device, such as a set-top box, may request a particular television channel in response to a user channel selection. A video serving office may respond by providing a unicast stream of the requested television channel to the set-top box. The user may be able to perform look-back to watch content which was previously broadcast on the television channel and/or to perform trick mode commands. Trick mode commands enable a user to pause, rewind, fast forward, and/or reposition play of content. However, unicast streaming may consume network resources (e.g., bandwidth, network device memory, etc.) as each customer device on a particular network connection may use a different unicast stream.

Network resources may be conserved by using multicast streaming. In multicast streaming, packets are sent only once and are distributed to all destinations on a distribution list at a point-to-multipoint distribution point. Thus, multicast streaming may significantly reduce the load on the network bandwidth. However, multicast streaming prevents users from being able to perform look-back to watch previously broadcast content or to perform trick mode commands, such as pausing or rewinding video content.

Implementations described herein relate to an in-home smart video cache. A customer premises router, which enables devices in the customer premises to communicate with each other and with the provider's network, may be configured to store video content for one or more frequently watched television channels. Thus, content from a particular television channel may be multicast to customers that frequently watch the particular television channel and the content may be stored in a video cache associated with the customer premises router (e.g., a home broadband router). In some implementations, the customer premises router may include storage space for the video cache and logic configured to manage the video cache. In other implementations, an add-on device may be connected to the customer premises router which includes storage space for the video cache and/or the logic configured to manage the video cache. When a customer selects to watch one of the television channels which is being stored in the video cache, the stored content for the television channel may be played from the video cache.

The in-home smart video cache may also be referred to as an extended content delivery network (CDN), because, from the customer's point of view, the stored content being played from the video cache is perceived as if the content were being received directly from the television services provider's CDN via streaming. In other words, any media playing device, such as a set-top box, a smart television, a digital media device, a game console, or a mobile communication device, may receive the television channel content from the video cache as if the content were being delivered to the media playing device from the video serving office (VSO) of the CDN. For example, the content may be received and stored in the video cache in an encrypted format using any digital rights management (DRM) scheme. The media playing device may need to authenticate and/or obtain license keys via an independent route in order to decrypt and play the video content stored in the video cache.

Since the video content is stored in the video cache, the media playing device may be able to perform a look-back to play content associated with one of the television channels stored in the video cache which has been multicast in the past. For example, the video cache may store up to n days of content for the television channel (e.g., 3 days of content). As an example, if the video cache includes 1 terrabyte (TB) of storage space, the video cache may be able to store three days of content for up to six frequently watched television channels. Furthermore, the user may be able to use the media playing device to perform trick mode commands with respect to the content being played from the video cache, such as pause, rewind, fast forward, and/or repositioning play of content commands.

The customer services router, and/or the add-on device connected to the customer premises router, may monitor the viewing habits of users associated with the customer premises router and may maintain information about the viewing habits, such as the top x most frequently watched television channels, in a viewing habits database. The viewing habits database may be used to determine whether a request to be included on a multicast distribution list for a particular television channel should be made to a video serving office. Thus, when a television channel is determined to be a frequently watched television channel, the customer services router may, for example, generate an Internet Group Management Protocol (IGMP) join request to be added to the multicast distribution list for content associated with the television channel. In some implementations, a user may be prompted to select one or more television channels to store in the video cache.

The video cache system may select content associated with the particular television channel and may obtain video segments for the selected content, such as Moving Picture Experts Group (MPEG) Dynamic Adaptive Streaming over Hypertext Transfer Protocol (DASH) video segments or Hypertext Transfer Protocol Live Streaming (HLS) video segments. The video segments may be encrypted with a DRM scheme. The video segments may be too large to be transmitted via multicast. For example, an MPEG DASH video segment may store approximately 4 seconds worth of content and may be 2-3 megabytes long. The video cache system may convert the video segments to transmission units, such as User Datagram Protocol (UDP) Maximum Transmission Units (MTUs). A UDP MTU may be about 1500 bytes long. UDP MTUs may be sent via multicast to the customer premises routers.

In some implementations, the video cache system may send some content prior to broadcast time during off-peak network use times in order to reduce the load on the network during peak times. The content may be protected from being played from the cache prior to the scheduled broadcast time. Furthermore, in some implementations, the video cache system may send snapshots for television channels via multicast to customer premises. A snapshot may include, for example, five seconds of content for a particular television channel. The snapshots may be sent to customer premises that have been determined as being associated with a channel surfing habit.

The video cache router at a particular customer premises may receive the transmission units from the video cache system, may convert the transmission units back into video segments, and may store the video segments in the cache. Updated transmission units may continue to be sent by the video cache system, converted back to video segments, and stored by the video cache router. The video cache system may overwrite the oldest content for a television channel with newly received content.

When a request to view a television channel, for which content has been stored in the cache, is received from a media playing device associated with the particular customer premises, the video cache router may provide the stored video segments to the media playing device. The media playing device may authenticate with the television provider, may obtain a license key from a license server, may use the license key to decrypt the video segments, and may play the video segments. The media playing device may perform look-back to play content stored in the video cache and/or may perform trick mode commands on the content.

If the video cache router detects a faulty of missing video segment in the video cache, the video cache router may request the faulty or missing video segment from the video cache system via unicast and the faulty or missing video segment may be sent to the video cache router via unicast.

FIG. 1 is a diagram of an exemplary environment 100 in which the systems and/or methods, described herein, may be implemented. As shown in FIG. 1, environment 100 may include a customer premises 110, a video serving office 140, a network 150, a content provider 160, a video content management system (VCMS) 170, an application server 180, and a license server 190.

Customer premises 110 may include a particular location (or multiple locations) associated with a customer. For example, customer premises 110 may include the customer's home, a customer's place of business, etc. Customer premises 110 may include an optical network terminal (ONT) 112, a broadband home router (BHR) 114, an add-on device 116, a set top box (STB) 118, a media device 120, a television 122, a remote control 124, a personal computer 126, a display 128, and a mobile device 130.

ONT 112 may receive content from video serving office 140 via a connection, such as, for example, a fiber-optic cable connection, a coaxial cable connection, a wireless connection, and/or another type of connection. Furthermore, ONT 112 may send information from video serving office 140 to BHR 114 and/or from BHR 114 to video serving office 140. In one implementation, ONT 112 may include an optical network terminal and ONT 112 and video serving office 140 may form part of a high-speed fiber optic network. In another implementation, ONT 112 may include a cable modem. In yet another implementation, ONT 112 may include a fixed wireless transceiver, a WiFi access point, and/or a Bluetooth device. Additionally or alternatively, ONT 112 may include a layer 2 and/or layer 3 network device, such as a switch, router, firewall, and/or gateway. Customer premises 110 may receive one or more services via the connection between ONT 112 and video serving office 140, such as, for example, a television service, Internet service, and/or voice communication (e.g., telephone) service.

BHR 114 may include a network device configured to function as a switch and/or router for the devices in customer premises 130. Furthermore, BHR 114 may function as a wireless access point (e.g., WiFi access point) for devices in customer premises 130. BHR 114 may support different types of interfaces, such as an Ethernet interface, a WiFi interface, and/or a Multimedia over Coaxial Alliance (MoCa) interface.

BHR 114 may implement smart cache functionality. For example, BHR 114 may determine one or more frequently watched television channels and may store content associated with the one or more frequently watched television channels in a cache. In some implementations, BHR 114 may cache/store the video content and/or perform functions associated with the stored video content without add-on device 116. In other words, the smart cache may be implemented within BHR 114. In other implementations, one or more cache functions may be performed by an add-on device 116. Thus, add-on device 116 may be connected to BHR 114, may include storage space for storing video content, and may perform one or more functions associated with determining one or more frequently watched television channels, storing content associated with the one or more frequently watched video channels, and/or accessing and providing stored video content to a media playing device. In some implementations, add-on device 116 may be a separate device connected to BHR 114 via a wired or wireless connection. In other implementations, add-on device 116 may include a device on a card that is inserted into a slot in BHR 114. BHR 114 and/or add-on device 116 may include, for example, 1 terrabyte (TB) of memory, which may enable BHR 114 and/or add-on device 116 to store three days' worth of content for up to six frequently watched television channels.

STB 118 may receive content and output the content to television 122 for display. STB 118 may include a component (e.g., a cable card or a software application) that interfaces with (e.g., plugs into) a host device (e.g., a personal computer, television 122, a stereo system, etc.) and allows the host device to display content. STB 118 may also be implemented as a home theater personal computer (HTPC), an optical disk player (e.g., digital video disk (DVD) or Blu-Ray™ disc player), a cable card, etc. STB 118 may receive commands and/or other type of data from other devices, such as remote control 124, and may transmit the data to other devices in environment 100.

Media device 120 may include a digital media player (e.g., Apple TV, Google Chromecast, Amazon Fire TV, etc.) configured to stream digital media files (e.g., video files, audio files, images, etc.) from personal computer 126, mobile device 130, ONT 112, add-on device 116, and/or another device via a wired connection or via a wireless connection (e.g., WiFi, etc.) with BHR 114. Media device 120 may include smart television features that enable media device 120 to support add-on applications. In some implementations, media device 120 may correspond to a High Definition Multimedia Interface (HDMI) dongle media device connected into a HDMI port of television 122. In some implementations, media device 120 may correspond to a gaming system (e.g., Microsoft XBOX, Sony Playstation, etc.).

Television 122 may output content received from STB 118 and/or from media device 120. Television 122 may include speakers as well as a display. In some implementations, television 122 may correspond to a smart television that supports add-on applications and/or is configured to communicate with other devices over an Internet Protocol (IP) connection and/or another type of network connection.

Remote control 124 may issue wired or wireless commands for controlling other electronic devices, such as television 122, media device 120, and/or STB 118. Remote control 124, in conjunction with television 122, media device 120, STB 118, and/or BHR 114, may allow a customer to interact with an application running on television 122, media device 120, STB 118, and/or BHR 114. Other types of devices (e.g., a keyboard, mouse, mobile phone, etc.) may be used instead of, or in addition to, remote control 124, in order to control television 122, media device 120, STB 118, and/or BHR 114.

Personal computer 126 may include a desktop computer, a laptop computer, a tablet computer, and/or another type of computation and/or communication device. Personal computer 126 may include a microphone to capture audio, a camera to capture images or video. Personal computer 126 may include display 128 for displaying images and/or video content received from BHR 114, STB 118, and/or media device 120. Personal computer 126 may also include a speaker for playing audio signals.

Mobile device 130 may include a portable communication device (e.g., a mobile phone, a smart phone, a phablet device, a global positioning system (GPS) device, and/or another type of wireless device); a laptop, tablet, or another type of portable computer; a media playing device; a portable gaming system; and/or any other type of mobile computer device with communication and output capabilities. Mobile device 130 may communicate with network 150 via base station 155. Furthermore, mobile device 130 may communicate with devices in customer premises 110 using a wireless connection via BHR 114 and/or directly using a short-range wireless method (e.g., Bluetooth, Near Field Communication (NFC), etc.). Mobile device 130 may consume content (e.g., play videos, etc.) received from video serving office 140 and/or stored by BHR 114 and/or add-on device 116.

Video serving office 140 may include one or more devices, such as computer devices and/or server devices, which ingest content, store content, format content, and/or deliver content to customer premises 110. For example, video serving office 140 may provide television channels and/or other type of content from a video content delivery system, such as VCMS 170. Furthermore, video serving office 140 may provide a connection service to network 150 for customer premises 110. Video serving office 140 may include a video cache system 145.

Video cache system 145 may include one or more devices, such as computer devices and/or server devices, which distribute video content to BHRs 114 for cache storage. Video cache system 145 may, for example, distribute content associated with the frequently watched channels via multicast to multiple customer premises 110 based on a multicast distribution list associated with a particular television channel.

Network 150 may include one or more circuit-switched networks and/or packet-switched networks. For example, network 150 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks. Network 150 may include base station 155. Base station 155 may function as a base station that enables wireless devices in customer premises 110, such as mobile device 130, to communicate with network 150. For example, base station 155 may include a Long Term Evolution eNodeB base station, a Global System for Mobile Communications (GSM) base station, a Code Division Multiple Access (CDMA) base station, and/or another type of base station.

Content provider 160 may include one or more devices, such as computer devices and/or server devices, which are configured to provide video content to VCMS 170. For example, content provider 160 may include free television broadcast providers (e.g., local broadcast providers, such as NBC, CBS, ABC, and/or Fox), for-pay television broadcast providers (e.g., TNT, ESPN, HBO, Cinemax, CNN, etc.), distributors of motion pictures, and/or Internet-based content providers (e.g., Youtube, Vimeo, Netflix, Hulu, Veoh, etc.) that stream content from web sites and/or permit content to be downloaded (e.g., via progressive download, etc.). Content provider 160 may include on-demand content providers (e.g., video on demand (VOD), pay per view (PPV), etc.).

VCMS 170 may include one or more server devices, or other types of computation or communication devices, that communicate with content providers 160 to ingest video content. VCMS 170 may process the video content to generate copies of the video content in one or more formats that are supported (e.g., that can be received, processed, and/or played) by the different types of user devices. VCMS 170 may publish the one or more formats, associated with the processed video content to a catalog associated with application server 180. VCMS 170 may provide processed video content to video serving office 140 for distribution to customer premises 110.

Application server 180 may include one or more server devices, or other types of computation or communication devices that receive metadata associated with video content processed by VCMS 170. Metadata may enable the video assets to be identified, managed, offered, and/or distributed to a user device in customer premises 110. For example, a customer may access application server 180 via video serving office 140 and may browse, rent, purchase, and/or otherwise request particular video content. Furthermore, application server 180 may perform customer authentication. For example, video content may be provided by video serving office 140 to BHR 114 and BHR 114 may store the video content in a cache. In order to view the video content, the customer may need to be authenticated with credentials (e.g., with a username and password, etc.) with application server 180. The authentication may be performed automatically using credentials stored in a device which the customer is using to consume the video content (e.g., STB 118, media device 120, mobile device 130, personal computer 126, etc.).

License server 190 may include one or more server devices, or other types of computation or communication devices, that may generate a license, associated with a digital rights management (DRM) scheme, and provide the license to a media player in connection with particular video content. The media player may use the license to decrypt the particular video content. For example, video content stored in BHR 114 may be encrypted and a media player on a device which the customer is using to consume the video content (e.g., STB 118, media device 120, mobile device 130, personal computer 126, etc.) may obtain a license from license server 190 and may use the obtained license to decrypt the video content.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
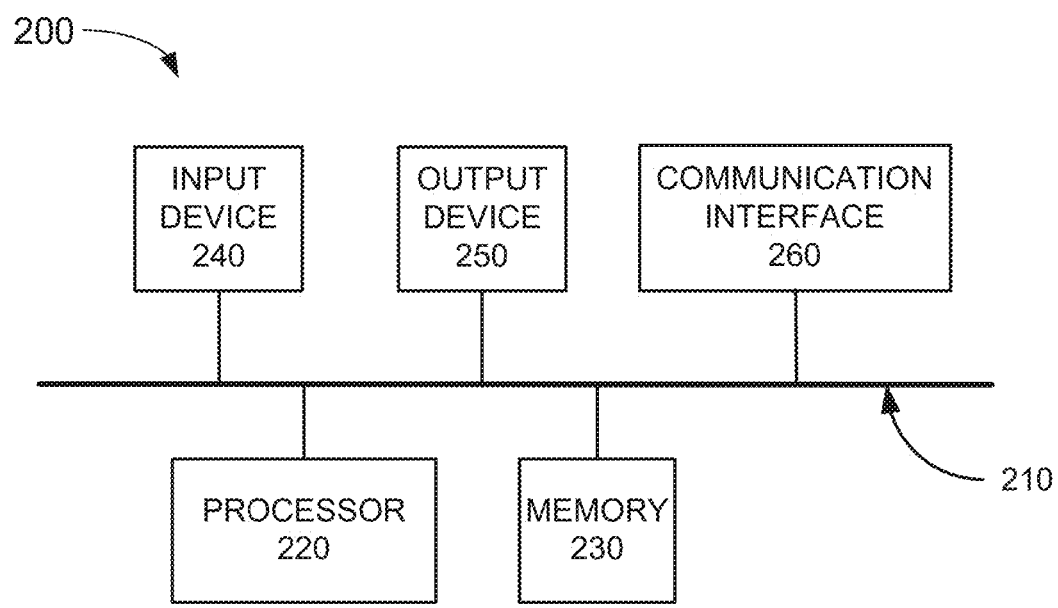
FIG. 2 is a diagram illustrating exemplary components of a computer device that may be included in one or more of the devices of FIG. 1.

FIG. 2 is a diagram illustrating exemplary functional components of device 200 according to an implementation described herein. BHR 114, add-on device 116, and/or video cache system 145 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to a smart video cache and/or a CDN extended into a customer premises. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than those depicted in FIG. 2. Additionally or alternatively, one or more components of device 200 may perform one or more tasks described as being performed by one or more other components of device 200.

Figure 3:
FIG. 3 is a diagram illustrating exemplary functional components of the video cache system of FIG. 1.

FIG. 3 is a diagram illustrating exemplary functional components of video cache system 145 according to an implementation described herein. The functional components of video cache system 145 may be implemented, for example, via processor 220 executing instructions from memory 230. Alternatively, some or all of the functional components of video cache system 145 may be implemented via hard-wired circuitry.

As shown in FIG. 3, video cache system 145 may include a VCMS interface 310, a conversion manager 320, and a distribution manager 330.

VCMS interface 310 may communicate with VCMS 170. For example, VCMS interface 310 may receive video segments for a particular television channel from VCMS 170. Furthermore, VCMS interface 310 may request video segments from VCMS 170 in a particular format, a particular bitrate, etc. Conversion manager 320 may convert received video segments into transmission units. For example, conversion manager 320 may receive MPEG DASH video segments, HLS video segments, and/or other types of video segments, and may convert the video segments into UDP MTU packets.

Distribution manager 330 may distribute the transmission units to customer premises. For example, for a particular television channel, distribution manager 330 may send transmission units that include content for the particular television channel via multicast to customer premises included on the distribution list associated with the particular television channel.

Although FIG. 3 shows exemplary functional components of video cache system 145, in other implementations, video cache system 145 may include fewer functional components, different functional components, differently arranged functional components, or additional functional components than those depicted in FIG. 3. Additionally or alternatively, one or more functional components of video cache system 145 may perform functions described as being performed by one or more other functional components of video cache system 145.

Figure 4:
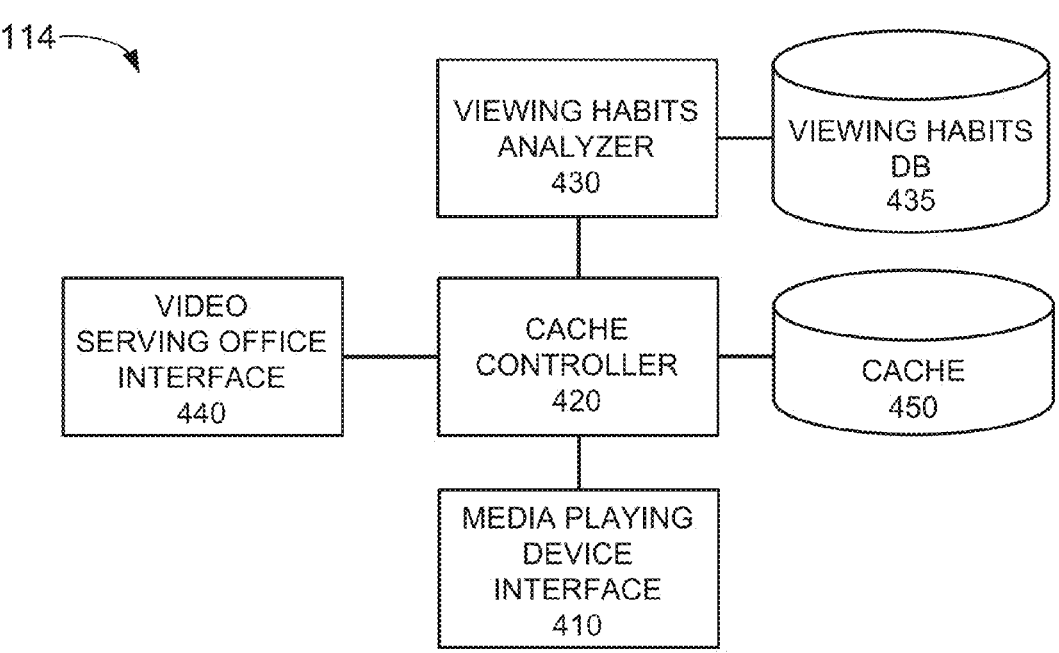
FIG. 4 is a diagram illustrating exemplary functional components of the home broadband router of FIG. 1.

FIG. 4 is a diagram illustrating exemplary functional components of BHR 114 according to an implementation described herein. The functional components of search BHR 114 may be implemented, for example, via processor 220 executing instructions from memory 230. Alternatively, some or all of the functional components of search optimization system 190 may be implemented via hard-wired circuitry.

As shown in FIG. 4, BHR 114 may include a media playing device interface 410, a cache controller 420, a viewing habits analyzer 430, a viewing habits database (DB) 435, a video serving office interface 440, and a cache 450.

Media playing device interface 410 may communicate with media playing devices associated with customer premises 110. For example, media playing interface 410 may communicate with STB 118, media device 120, television 122, personal computer 126, mobile device 130, and/or another media device associated with customer premises 110. Media playing interface 410 may receive a request to tune in to a particular television channel, a request to perform a look-back process for the particular television channel, a request to perform a trick mode command, a request to access particular content stored in cache 450, and/or may receive another command and forward the command to cache controller 420. Media playing device 410 may provide video segment data associated with the request to the media playing device for playback.

Cache controller 420 may control cache 450. For example, cache controller 420 may receive transmission units from video serving office interface 440, may convert the transmission units into video segments, and may store the video segments in cache 450. Furthermore, cache controller 420 may retrieve stored video segments from cache 450 and may provide the retrieved video segments to media playing device interface 410. Moreover, cache controller 420 may provide information relating to requests received from media playing device interface 410 to viewing habits analyzer 430.

Viewing habits analyzer 430 may analyze viewing habits based on requests received from media devices associated with customer premises 110 and may store information relating to the analyzed viewing habits in viewing habits DB 435. Viewing habits analyzer 430 may receive information relating to requests for content stored in cache 450. Furthermore, viewing habits analyzer 430 may intercept request for content not stored in cache 450. For example, if a user selects a television channel not stored in cache 450, viewing habits analyzer 430 may record and analyze the request and may store information about the request in viewing habits DB 435.

Viewing habits DB 435 may store information relating to viewing habits. For example, viewing habits DB 435 may include information identifying the top n (e.g., the top 6) most watched television channels; information about times of day and/or days of week when television, and/or a particular television channel, has been watched in the past; information about whether or not the customer premises is associated with a channel surfing habit and/or particular times or days of week when channel surfing has occurred in the past; information identifying particular television content (e.g., a particular television show) that has been watched at the customer premises; information identifying particular television content that a user associated with the customer premises has scheduled to record; and/or other types of viewing habits information. Furthermore, viewing habits DB 435 may also collect information about television channels, television shows, and/or time slots that the users of the customer premises never watch. Thus, for example, content associated with time slots that the users never watch may be skipped during recording and/or during a look-back process. If a user requests content associated with a skipped time slot, the content may be requested by BHR 114 from video serving office 140 via unicast.

Video serving office interface 440 may receive video content from video serving office 140. For example video serving office interface 440 may receive transmission units from video cache system 145 and may provide the transmission units to cache controller 420. Furthermore, video serving office interface 440 may request a missing or faulty video segment from video serving office 140 if a missing or faulty video segment is detected during playback of content from cache 450.

Cache 450 may store video content received from video cache system 145. The video content may be stored as video segments in a particular format that was received from video cache system 145 via transmission units. The stored video segments may be sent by video cache system 145 in an encrypted form and may be stored in cache 450 in the encrypted form. In some implementations, cache 450 may have the storage capacity to store at least 1 TB of video content. In other implementations, cache 450 may have a different storage capacity.

Although FIG. 4 shows exemplary functional components of BHR 114, in other implementations, BHR 114 may include fewer functional components, different functional components, differently arranged functional components, or additional functional components than those depicted in FIG. 4. Additionally or alternatively, one or more functional components of BHR 114 may perform functions described as being performed by one or more other functional components of BHR 114.

Figure 5:
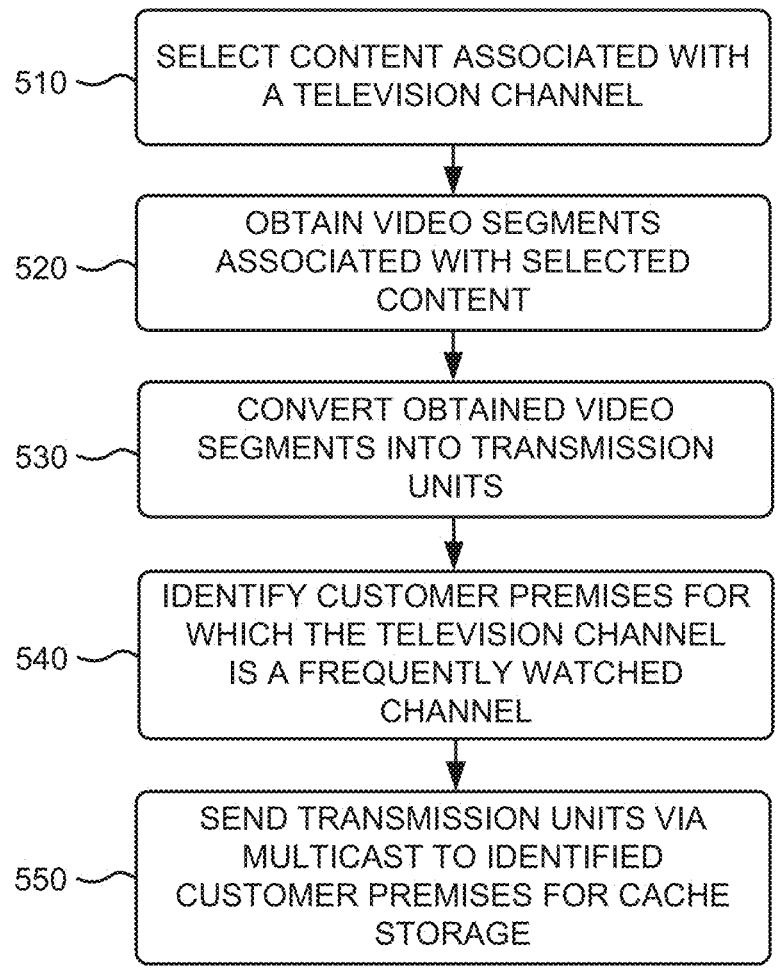
FIG. 5 is a flowchart for providing video content for cache storage according to one or more implementations described herein.

FIG. 5 is a flowchart for providing video content for cache storage according to one or more implementations described herein. In some implementations, the process of FIG. 5 may be performed by video cache system 145. In other implementations, some or all of the process of FIG. 5 may be performed by another device or a group of devices separate from and/or including video cache system 145.

The process of FIG. 5 may include selecting content associated with a television channel (block 510). As an example, video serving office 140 may select content that is to be broadcast for a particular channel at a particular time (e.g., based on a broadcast schedule). As another example, content for a particular television channel may be received directly from content provider 160 via VCMS 170 at substantially the scheduled broadcast time (e.g., for live content, such as a sporting event).

Video segments associated with the selected content may be obtained (block 520). For example, video cache system 145 may obtain vide segments associated with the selected content from VCMS 170. VCMS 170 may store video segments for the selected content in different codecs and/or different bit rates. Video cache system 145 may select a particular bit rate and/or codec based on, for example, a network bandwidth load at the time that the video segments are to be sent to customer premises 110. The video segments may include, for example, MPEG DASH video segments, HLS video segments, and/or other types of video segments. The obtained video segments may be converted into transmission units (block 530). For example, conversion manager 320 may convert the video segments into UDP MTU packets.

Customer premises for which the television channel is a frequently watched channel may be identified (block 540) and the transmission units may be sent by multicast to the identified customer premises for cache storage (block 550). For example, distribution manager 330 may determine which customer premises 110 are included on a multicast distribution list associated with the television channel based on an IGMP join request received from BHRs 114 of customer premises 110 for which the television channel is a frequently watched television channel selected to be stored in cache 450. The multicast distribution list may further include all the customer premises 110 with users that are currently watching the television channel (e.g., based on IGMP join requests received from media playing devices of the users currently watching the television channel).

In some implementations, video cache system 145 may send some content prior to broadcast time during off-peak network use times in order to reduce the load on the network during peak times. The content may be protected from being played from cache 450 by cache controller 420 prior to the scheduled broadcast time. Moreover, if a customer has requested to record particular content, in some implementations, the particular content may be sent prior to broadcast to be stored in cache 450 during an off-peak time in order to reduce the network bandwidth load. Furthermore, in some implementations, video cache system 145 may send snapshots for television channels via multicast to customer premises. A snapshot may include, for example, five seconds of content for a particular television channel. The snapshots may be sent to customer premises that have been determined as being associated with a channel surfing habit. Since when a typical user is channel surfing, the user may only spend a few seconds on each channel, sending the snapshots may reduce the load on the network traffic by reducing the number of unicast messages sent back and forth between customer premises 110 and video serving office 140 as the user changes to a new channel. Thus, viewing habits analyzer 430 may determine that customer premises 110 is associated with a channel surfing habit and may, when a media device associated with customer premises 110 is active, send an IGMP join request to be added to a multicast distribution list for a multicast stream of channel snapshots.

Figure 6:
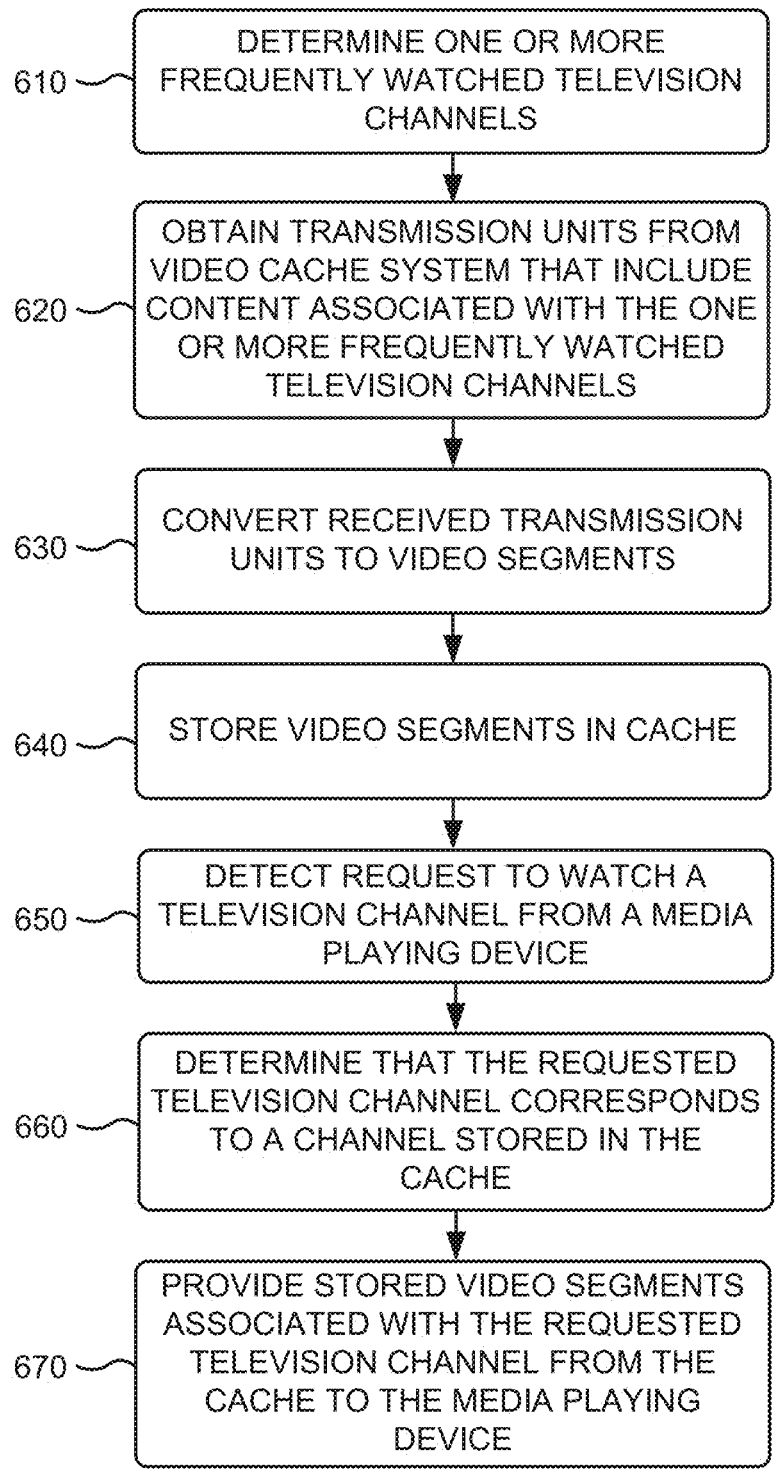
FIG. 6 is a flowchart for managing a video cache according to one or more implementations described herein.

FIG. 6 is a flowchart for managing a video cache according to one or more implementations described herein. In some implementations, the process of FIG. 6 may be performed by BHR 114. In other implementations, some or all of the process of FIG. 6 may be performed by another device or a group of devices separate from and/or including BHR 114.

The process of FIG. 6 may include determining one or more frequently watched television channels (block 610). For example, BHR 114 may monitor the viewing habits of users associated with customer premises 110, including one or more frequently watched television channels (e.g., the 6 most frequently watched television channels), and may store information about the viewing habits in viewing habits DB 435. BHR 114 may use the information to determine which channels should be requested via an IGMP join request, received and stored in cache 145 of BHR 114 (and/or add-on device 116).

The viewing habits information collected and stored in viewing habits DB 435 may include, for example, information identifying one or more frequently watched television channels (e.g., 6 or some other number of the most watched television channels) for the particular customer premises 110. Additionally or alternatively, the information may include information about times of day and/or days of week when television, and/or a particular television channel, has been watched in the past at customer premises 110; information about whether or not customer premises 110 is associated with a channel surfing habit and/or particular times or days of week when channel surfing has occurred in the past; information identifying particular television content (e.g., a particular television show) that has been watched at customer premises 110; information identifying particular television content that a user associated with customer premises 110 has scheduled to record; and/or other types of viewing habits information.

Transmission units may be obtained, from a video cache system, that include content associated with the one or more frequently watched television channels (block 620), the received transmission units may be converted to video segments (block 630), and the video segments may be stored in a cache (block 640). For example, BHR 114 may receive UDP MTU packets from video cache system 145, may convert the UDP MTU packets back into video segments of the type which were used to generate the UDP MTU packets, and may store the video segments in cache 145.

A request to watch a television channel may be received from a media playing device (block 650) and a determination may be made that the requested television channel corresponds to a channel stored in the cache (block 660). For example, a user may use a media playing device, such as STB 118, media device 120, television 122, personal computer 126, mobile device 130, a gaming console, and/or another type of media playing device, to request to watch a particular television channel or to watch content stored in cache 145 (e.g., content that the user has requested to record). BHR 114 may determine that the requested content is stored in cache 145 and may determine that a request for the content (e.g., by requesting a unicast stream from video serving office 140) may not need to be sent to video serving office 140.

Stored video segments associated with the requested television channel may be provided from the cache to the media playing device (block 670). For example, BHR 114 may retrieve video segments associated with the requested content and may provide the requested content to the media playing device. The media playing device may authenticate with application server 180, may obtain a DRM license key from license server 190, may use the DRM license key to decrypt the video segments and may play the video segments on an output device.

Figure 7:
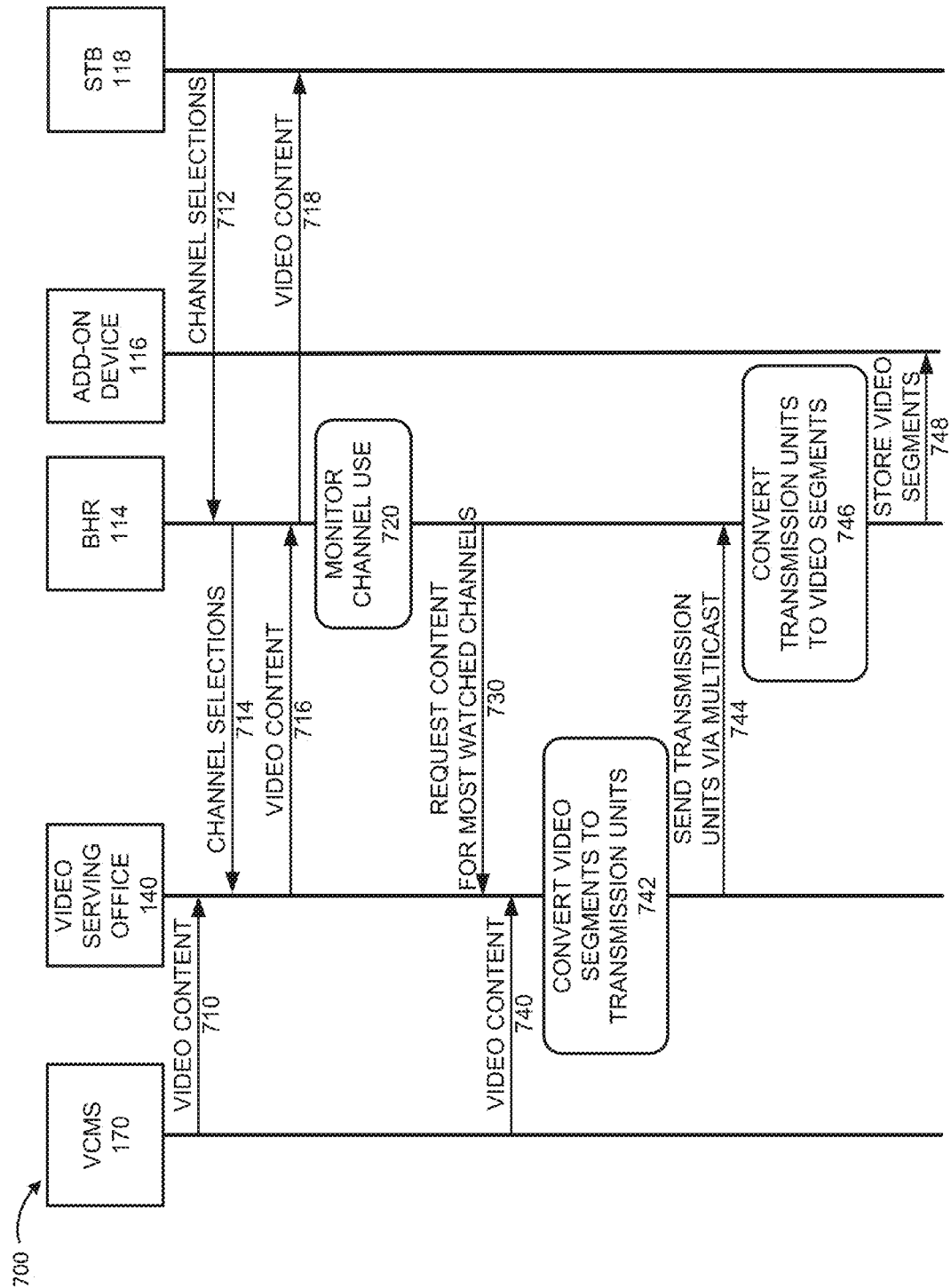
FIG. 7 is an exemplary signal flow diagram according to an implementation described herein.

FIG. 7 is an exemplary signal flow diagram 700 according to an implementation described herein. Signal flow 700 may include VCMS 170 sending video content to video serving office 140 (signal 710). The video content may be in the form of MPEG video segments, HLS video segments, and/or in another format. A user at customer premises 110 may use STB 118 to make channel selections, STB 118 may send the channel selections to BHR 114 (signal 712), BHR 114 may forward the channel selections to video serving office 140 (signal 714), and video serving office 140 may continue to provide content to STB 118 via BHR 114 (signals 716 and 718). Furthermore, BHR 114 may monitor channel use at customer premises 110 by monitoring the selection forwarded to video serving office 140 from STB 118, as well as from all other media playing devices associated with customer premises 110 (block 720). BHR 114 may, at periodic intervals and based on the monitored channel use, request content associated with the most watched channels from video serving office 140 (signal 730). Alternatively, or additionally, video serving office 140 may monitor channel use associated with customer premises 110 and may determine which content to send to cache 145 of BHR 114 based on the monitored channel use.

Video serving office 140 may continue to receive video content from VCMS 170 (signal 740). Video segments associated with the most watched channels may be converted to transmission units (block 742) and the transmission units for a particular channel may be sent by multicast to customer premises 110 for which the particular channel is one of the most watched channels (signal 744). For example, assume that video serving office 140 serves a neighborhood/area of 10,000 customer premises and for 2,000 of the customer premises 110, channel X is on the list of frequently watched channels, while users at another 500 customer premises 110 are currently watching channel X. Video serving office 140 may multicast the content being broadcasted on channel X via UDP MTU multicast packets to the 500 customer premises 110 where the users are currently watching channel X, as well as to the 2,000 customer premises for which channel X is a frequently watched channel.

BHR 114 may receive the UDP MTU multicast packets and may convert the received packets back to video segments (e.g., MPEG video segments, HLS video segments, etc.) (block 746) and may store the video segments in add-on device 116, which includes 1 TB of storage space (signal 748).

Figure 8:
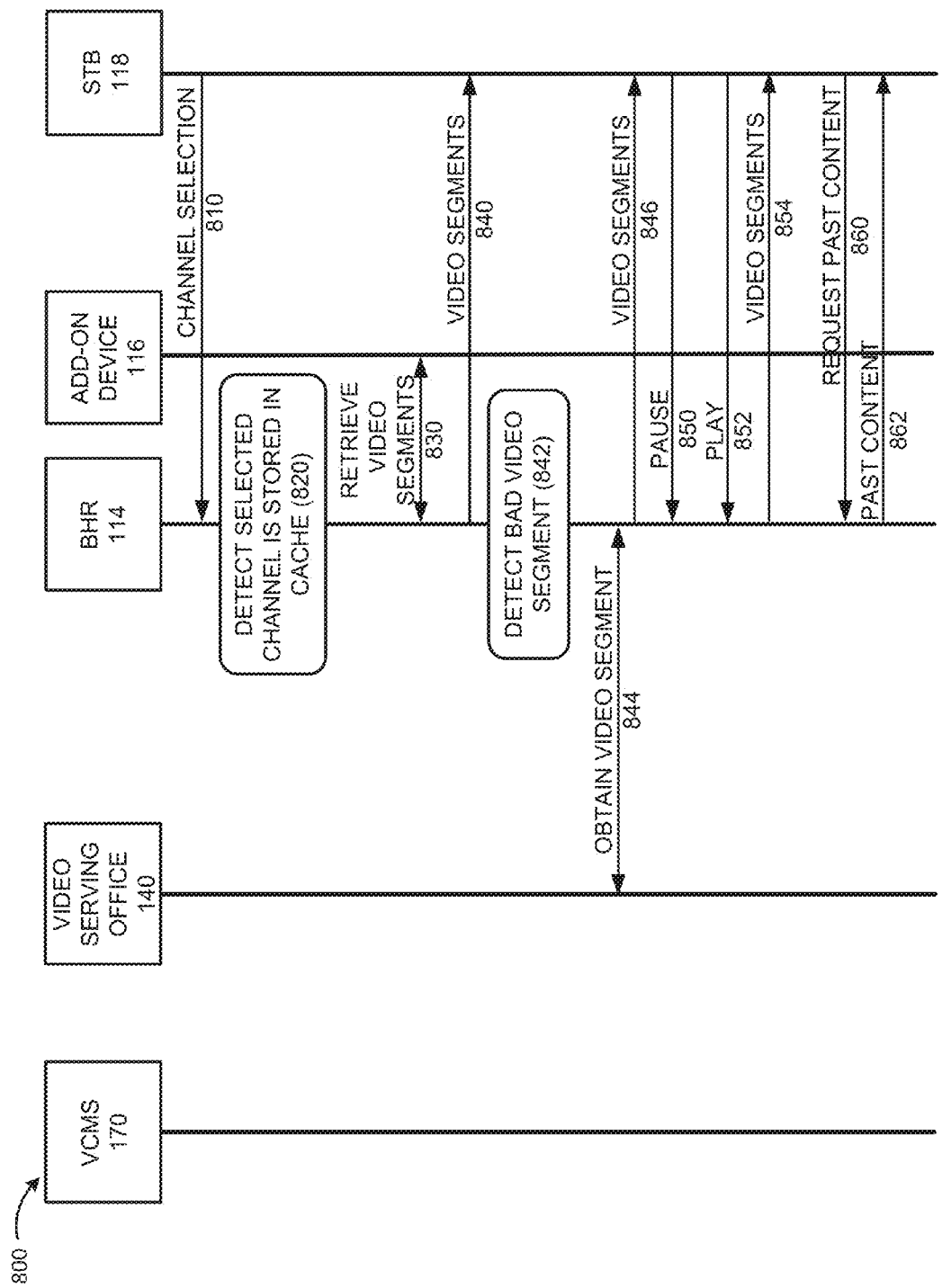
FIG. 8 is another exemplary signal flow diagram according to an implementation described herein.

FIG. 8 is another exemplary signal flow diagram 800 according to an implementation described herein. Signal flow diagram 800 may be a continuation of signal flow diagram 700. Thus, after the video segments are stored in cache 450, at a later time, BHR 114 may detect a channel selection from STB 118 (signal 810). BHR 114 may detect that the selected channel is associated with channel content stored in cache 145 (block 820), may start to retrieve video segments associated with the selected channel from add-on device 116 (signal 830), and may provide the video segments to STB 118 (signal 840).

BHR 114 may detect a bad video segment (842). For example, the bad video segment may include corrupted or missing data. In response, BHR 114 may request the video segment corresponding to the bad video segment from video serving office 140 and the video segment may be obtained via unicast from video serving office 140 (signal 844). BHR 114 may provide the video segment to STB 118 and may continue to provide video segments stored in cache 450 of add-on device 116 to STB 118. The user may later pause the content (signal 850) and re-start the playing of content (signal 852). Since the content is being played from cache 450 of add-on device 116, BHR 114 may pause and re-start the content by providing subsequent video segments to STB 118 (signal 854). The user may also perform a look-back process to view past content associated with the television channel (signal 860) and BHR 114 may provide the past content by retrieving the past content from cache 450 of add-on device 116 and providing the past content to STB 118. For example, the user may watch content that was broadcast on the television channel the previous day.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

As an example, BHR 114 may collect customer statistics regarding viewing habits, use of cache 450, and network bandwidth load and/or capacity, to determine an optimum and/or efficient amount of content to store in cache 450. For example, BHR 114 may start with the content for the 5 most frequently watched channel to store in cache 145 for customer premises 110 and may monitor network bandwidth use to determine whether to increase or decrease the number of channels to store in cache 450, to determine whether to increase or decrease how much content to store for a channel, and/or to determine whether to increase or decrease how much content to store for a particular channel.

As another example, while a series of blocks have been described with respect to FIGS. 5 and 6, and a series of signal flows have been described with respect to FIGS. 7 and 8, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a computer device, the method comprising:
    determining, by the computer device, one or more frequently watched television channels associated with a customer's account;
    obtaining, by the computer device, content associated with the one or more frequently watched television channels via multicast transmission units from a video serving office associated with a television services provider, wherein the multicast transmission units include User Datagram Protocol (UDP) Maximum Transmission Units (MTUs);
    converting, by the computer device, the multicast transmission units into video segments playable by a media playing device, wherein the video segments playable by the media playing device include Moving Picture Experts Group (MPEG) Dynamic Adaptive Streaming over Hypertext Transfer Protocol (DASH) video segments or Hypertext Transfer Protocol Live Streaming (HLS) video segments;
    storing, by the computer device, the video segments in a cache associated with the computer device;
    detecting, by the computer device, a selection of a television channel associated with the obtained content made via the media playing device; and
    providing, by the computer device, the stored video segments to the media playing device, in response to detecting the selection of the television channel associated with the obtained content, wherein the provided video segments are treated by the media playing device as if being received from the video serving office, and wherein the computer device is configured to function as a customer premises switch or router.

2. The method of claim 1, wherein the video segments stored in the cache for the television channel include at least the past three days of content for the television channel, the method further comprising:
    receiving, from the media playing device, a request to view content for the television channel that was broadcast at a particular time during the past three days; and
    providing the requested content for the television channel to the media playing device.

3. The method of claim 1, further comprising:
    receiving, from the media playing device, a trick mode command, wherein the trick mode command includes at least one of a pause command, a play command, a rewind command, or a fast forward command; and
    executing the trick mode command with respect to the stored video segments provided to the media playing device.

4. The method of claim 1, wherein the video segments stored in the cache are encrypted, and wherein the media playing device performs authentication and decryption on the video segments to play the video segments.

5. The method of claim 1, wherein determining the one or more frequently watched television channels associated with the customer's account includes:
    receiving, from a user associated with the customer's account, a selection of the one or more frequently watched television channels as channels to store in the cache.

6. The method of claim 1, further comprising:
    detecting a faulty or missing video segments among the stored video segments;
    requesting a replacement video segment from the video serving office; and
    storing the replacement video segment in the cache.

7. The method of claim 1, further comprising:
    receiving updated content associated with the television channel via multicast transmission units from the video serving office;
    converting the multicast transmission units associated with the updated content into updated video segments; and
    storing the updated video segments in the cache.

8. The method of claim 1, wherein the media playing device includes:
    a set-top box;
    a smart television;
    a High Definition Multimedia Interface (HDMI) dongle media device;
    a game console; or
    a mobile communication device.

9. The method of claim 1, wherein the computer device includes a broadband router and wherein the cache includes at least one terabyte of storage capacity.

10. A computer device comprising:
  logic configured to:
    determine one or more frequently watched television channels associated with a customer's account;
    obtain content associated with the one or more frequently watched television channels via multicast transmission units from a video serving office associated with a provider of television services, wherein the multicast transmission units include User Datagram Protocol (UDP) Maximum Transmission Units (MTUs);
    convert the multicast transmission units into video segments playable by a media playing device, wherein the video segments playable by the media playing device include Moving Picture Experts Group (MPEG) Dynamic Adaptive Streaming over Hypertext Transfer Protocol (DASH) video segments or Hypertext Transfer Protocol Live Streaming (HLS) video segments;
    store the video segments in a cache associated with the computer device;
    detect a selection of a television channel associated with the obtained content made via the media playing device; and
    provide the stored video segments to the media playing device, in response to detecting the selection of the television channel associated with the obtained content, wherein the provided video segments are treated by the media playing device as if being received from the video serving office, and wherein the computer device is configured to function as a customer premises switch or router.

11. The computer device of claim 10, wherein the video segments stored in the cache for the television channel include at least three days of content for the television channel, and wherein the logic is further configured to:
  receive, from the media playing device, a request to view content for the television channel that was broadcast at a particular time during the three days; and
  provide the requested content for the television channel to the media playing device.

12. The computer device of claim 10, wherein the logic is further configured to:
  receive, from the media playing device, a trick mode command, wherein the trick mode command includes at least one of a pause command, a play command, a rewind command, or a fast forward command; and
  execute the trick mode command with respect to the stored video segments provided to the media playing device.

13. The computer device of claim 10, wherein the logic is further configured to:
  receive updated content associated with the television channel via multicast transmission units from the video serving office;
  convert the multicast transmission units associated with the updated content into updated video segments; and
  store the updated video segments in the cache.

14. The computer device of claim 10, wherein the logic is further configured to:
  determine that the customer's account is associated with a channel surfing habit; and
  request channel snapshots via a multicast join request, in response to determining that the customer's account is associated with a channel surfing habit.

15. A computer-readable memory device storing instructions executable by one or more processors, the computer-readable memory device comprising:
  one or more instructions to determine one or more frequently watched television channels associated with a customer's account;
  one or more instructions to obtain content associated with the one or more frequently watched television channels via multicast transmission units from a video serving office associated with a provider of television services, wherein the multicast transmission units include User Datagram Protocol (UDP) Maximum Transmission Units (MTUs);
  one or more instructions to convert the multicast transmission units into video segments playable by a media playing device, wherein the video segments playable by the media playing device include Moving Picture Experts Group (MPEG) Dynamic Adaptive Streaming over Hypertext Transfer Protocol (DASH) video segments or Hypertext Transfer Protocol Live Streaming (HLS) video segments;
  one or more instructions to store the video segments in a cache associated with a customer premises router device configured to function as a customer premises switch or router;
  one or more instructions to detect a selection of a television channel associated with the obtained content made via the media playing device; and
  one or more instructions to provide the stored video segments to the media playing device, in response to detecting the selection of the television channel associated with the obtained content, wherein the provided video segments are treated by the media playing device as if being received from the video serving office.

16. The computer-readable memory device of claim 15, wherein the video segments stored in the cache for the television channel include at least three days of content for the television channel, the computer-readable memory device further comprising:
  one or more instructions to receive, from the media playing device, a request to view content for the television channel that was broadcast at a particular time during the three days; and
  one or more instructions to provide the requested content for the television channel to the media playing device.

17. The computer-readable memory device of claim 15, further comprising:
  one or more instructions to receive, from the media playing device, a trick mode command, wherein the trick mode command includes at least one of a pause command, a play command, a rewind command, or a fast forward command; and
  one or more instructions to execute the trick mode command with respect to the stored video segments provided to the media playing device.

18. The computer-readable memory device of claim 15, further comprising:
  one or more instructions to determine that the customer's account is associated with a channel surfing habit; and
  one or more instructions to request channel snapshots via a multicast join request, in response to determining that the customer's account is associated with a channel surfing habit.

19. The computer-readable memory device of claim 15, wherein the video segments stored in the cache are encrypted.

20. The method of claim 1, wherein obtaining content associated with the one or more frequently watched television channels includes:
- obtaining at least some of the content associated with the one or more frequently watched television channels during an off-peak network use time; and
- preventing the obtained at least some of the content from being played prior to a scheduled broadcast time for the obtained at least some of the content.

\* \* \* \* \*